Patented July 29, 1941

2,250,474

UNITED STATES PATENT OFFICE 2,250,474

STERILIZATION PROCESS

Josef Eisenbrand and Hermann Picher, Frankfort-on-the-Main-Hochst, Germany, assignor to Winthrop Chemical Company, Inc., New York, N. Y., a corporation of New York No Drawing. Application September 20, 1938, Serial No. 230,804. In Germany October 8, 1937

6 Claims. (Cl. 167—58)

The present invention relates to a sterilization process; more particularly to a process which prevents the decomposition of solutions sensitive to heat.

Solutions or suspensions of physiologically active substances frequently decompose, either by oxidation or saponification or in some other way, often more readily within a pH-region of more than 5 than in a strongly acid region. This occurs particularly when the temperature is raised, as for instance during sterilization by heat. Moreover, the solutions often show, when heated, a pH-displacement to the alkaline side which declines when the solutions are cooled again, but promotes the decomposition of the solutions.

Now we have found that this drawback may be overcome by adding to the solution or suspension, before it is sterilized, urea and an acid in such a quantity that the pH-range between about 5 and about 7 which is favorable for injection is attained only after the sterilization period desired in each particular case is over. By the combination urea+acid, for instance urea+hydrochloric acid, the pH-value of the solution is influenced in such a manner that owing to the saponification of the urea by the acid the pH-value is displaced to the alkaline side; but this displacement does not occur in a uniform manner. After the lapse of a certain heating period the pH-value rises spasmodically from the original concentration to values which are near the neutral point. The quantity of urea and acid to be applied in each particular case can readily be determined by simple tests and brought into agreement with the desired sterilization period. Generally small quantities of less than 1 per cent. are sufficient. The lower limit is about 0.05 per cent. Only very rarely an amount of several per cent. is used; but about 10 per cent. are practically never exceeded.

The acids to be applied are hydrochloric acid as well as other physiologically compatible acids, for instance lactic acid, tartaric acid, citric acid, phosphoric acid or a fatty acid.

The systems herein described may be regulated within very wide limits, so that by a suitable variation of the concentration of urea or hydrochloric acid it is possible to prepare solutions which have a pH-value between 2 and 4 for an exactly determined, desired sterilization period, for instance for 10, 30 or 50 minutes. After the sterilization the pH-value regulates itself automatically in the sealed ampoules to 5.5–7 according to the quantity of urea and acid added.

This kind of stabilization may also be utilized by making acid solutions or suspensions of medicinal substances of all kinds of a pH-value of about 2 which at ordinary temperature maintain their acid condition for many years and shortly before use are sterilized for a period prescribed in order to attain a pH-value suitable for the injection.

The following examples illustrate the invention, but they are not intended to limit it thereto:

1. (a) 0.8 gram of the hydrochloride of para-butylamino-benzoyl-dimethylamino-ethanol, 0.6 gram of urea, 20 cc. of N/10 hydrochloric acid, 50 cc. of 0.2 N-mono-potassium phosphate solution and water to make 100 cc. are filled into ampoules which are then sterilized for 48 minutes and carefully cooled to room temperature.

pH-value before sterilizing the ampoules__ 2.54
pH-value after sterilizing the ampoules____ 5.32
Degree of saponification_____per cent___0.47

(b) 0.8 gram of the hydrochloride of para-butylamino-benzoyl-dimethylamino-ethanol, 0.6 gram of urea, 10 cc. of N/10 hydrochloric acid, 50 cc. of 0.2 N-mono-potassium phosphate solution and water to make 100 cc. are filled into ampoules, the ampoules are sterilized for 27 minutes and then carefully cooled to room temperature.

pH-value before sterilizing the ampoules___ 2.81
pH-value after sterilizing the ampoules____ 5.34
Degree of saponification_____per cent___ 0.47

In contrast, a solution of 0.8 gram of the hydrochloride of para-butylaminobenzoyl-dimethylamino-ethanol and 0.15 gram of urea in water to make 100 cc. had before the sterilization a pH-value of 6.08 and after the sterilization a pH-value of 6.73 and a saponification value of 1.42 per cent.

2. 0.01 gram of the hydrochloride of ortho-dihydroxy-phenyl-propanolamine, 0.6 gram of urea, 10 cc. of N/10 hydrochloric acid and water to make 100 cc. are filled into ampoules in which about ⅕ of the capacity is filled with air. The ampoules are then sterilized for 25 minutes. The solution has only a very feeble pink discoloration.

pH-value before the sterilization_____ 1.93
pH-value after the sterilization_____ 5.80

In contrast, a solution of 0.01 gram of the said compound in 100 cc. of water, but prepared without the addition of urea and hydrochloric acid shows after the same sterilization period a strong reddish-brown discoloration and a reduction of the pH-value from 6.48 before the sterilization to 4.35 after the sterilization.

3. 2 grams of the hydrochloride of para-aminobenzoyl-diethylamino-ethanol, 0.6 gram of urea, 10 cc. of N/10 hydrochloric acid, 50 cc. of 0.2 N-mono-potassium phosphate solution and water to make 100 cc. are filled into ampoules of a capacity of 5 cc. and the ampoules are heated for 26 minutes in boiling water. They are then carefully cooled to room temperature.

pH-value before the sterilization_____ 3.11
pH-value after the sterilization_____ 5.30
Degree of saponification_____percent__ 0.52

For comparative purposes a solution of 2 per cent. strength of the hydrochloride of para-aminobenzoyl-diethylamino-ethanol, 0.15 per cent of urea was sterilized only for 20 minutes and showed before the sterilization a pH-value of 6.07, and after the sterilization a pH-value of 6.46 and a saponification value of 1.55 per cent.

The advantage of the addition of hydrochloric acid is evident therefrom.

4. From a solution of 0.1 gram of laevo-ortho-dihydroxy-phenylethanolmethylamine and 5.5 cc. of N/10 hydrochloric acid in 94.5 cc. of water 10 cc. are removed and to this portion 0.6 gram of urea and 10 cc. of N/10 hydrochloric acid are added and the whole is made up with water to 100 cc. The final solution thus obtained has a content of 0.01 per cent. of laevo-ortho-dihydroxyphenylethanolmethylamine. The solution is then sterilized for 22 minutes at 100° C. It shows a slight pink coloration.

pH-value before the sterilization_____ 2.06
pH-value after the sterilization_____ 5.79

In contrast, a solution prepared in the same manner, but without urea and hydrochloric acid shows, when sterilized likewise for 22 minutes a strong red-brown discoloration.

pH-value before the sterilization_____ 6.20
pH-value after the sterilization_____ 3.90

5. 2.5 mgms. of 6.7-dimethyl-9-(1'-dextro-ribityl-)iso-alloxazine are shaken for half an hour at room temperature with 5 cc. of a solution containing 0.6 gram of urea, 5 cc. of N/10 hydrochloric acid and water to make 100 cc. The filtrate is poured into ampoules of a capacity of 1 cc. and the ampoules are heated for 35 minutes in boiling water.

pH-value before the sterilization_____ 2.37
pH-value after the sterilization_____ 7.14

The compound does not show any decomposition phenomena. A solution which is prepared in the same manner without the addition of urea and hydrochloric acid, and is adjusted by means of a phosphate buffer-substance from the beginning to a ph-value of 7.06, shows a loss of about 20 per cent. of the compound after it has been heated for 35 minutes to 100° C.

6. 89 mgms. of crystallized blood-sugar-reducing hormone (2000 international units) are dissolved in 50 cc. of water with the addition of hydrochloric acid. 17.6 mgms. of zinc sulfate and 300 mgms. of protamine are added to this solution. The feebly opalescent solution is adjusted by means of hydrochloric acid to a pH-value of 3.6, mixed with 7.2 grams of urea and then heated for 4½ hours to 60° C. to 65° C.

pH-value before the sterilization_____ 3.5–3.6
pH-value after the sterilization_____ 7.0

The attaining of the pH-value of 7.0 causes, besides the stabilization, the precipitation of the compound of the blood-sugar-reducing hormone of pancreas and protamine in the form of a flocculent suspension which shows the known effect of the long lasting action of the said hormone. Instead of protamine there may be used with the same success other substances causing a retardation of the effect of the blood-sugar-reducing hormone of the pancreas, for instance histone, protone, or the hydrochloride of bis-2-methyl-4-aminoquinolyl-6-carbamide.

7. 0.8 gram of the hydrochloride of para-butylamino-benzoyldimethylamino-ethanol, 0.6 gram of urea, 20 cc. of N/10 propionic acid and water to make 100 cc. are filled into ampoules and sterilized for about half an hour. They are then carefully cooled to room temperature.

pH-value before the sterilization_____ About 3.5
pH-value after the sterilization_____ About 5.0
Degree of saponification_____ About 1%

We claim:

1. A process of sterilizing a solution of a physiologically active substance liable to decomposition within a pH-range of more than 5 during sterilization by heat which process comprises regulating the pH-value of the solution by adding thereto before sterilization a small amount of urea and acid sufficient to automatically adjust the pH-value of the sterilized solution to a pH-range above 5, and subjecting the solution to the sterilization step by heating.

2. A process in accordance with claim 1 in which hydrochloric acid is added to the solution.

3. A process in accordance with claim 1 in which the physiologically active substance is para-butylamino-benzoyl-dimethylamino-etha-nol, and which contains hydrochloric acid and a primary alkali surface.

4. A process in accordance with claim 1 in which the solution contains the hydrochloride of ortho-dihydroxyphenyl-propanolamine and hydrochloric acid as the acid component.

5. A process in accordance with claim 1 in which the solution contains the hydrochloride of para-amino-benzoyl-diethyl-amino-ethanol, hydrochloric acid and a primary alkali phosphate.

6. A process of sterilizing a solution of a physiologically active substance liable to decomposition within a pH range of more than 5 during sterilization by heat or through the action of oxygen which process comprises regulating the pH value of the solution by adding thereto before sterilization an amount of from about 0.05% to about 10% of urea and acid, and subjecting the solution to the sterilization step.

JOSEF EISENBRAND.
HERMANN PICHER.